No. 607,521. Patented July 19, 1898.
T. R. McKNIGHT.
DUMP CAR.
(Application filed May 14, 1897.)
(No Model.) 3 Sheets—Sheet 2.

Witnesses.
Inventor.
Thomas R. McKnight,
by Bond, Adams, Pickard & Jackson.
Atty's No. 607,521. Patented July 19, 1898.
T. R. McKNIGHT.
DUMP CAR.
(Application filed May 14, 1897.)
(No Model.) 3 Sheets—Sheet 3.

Witnesses.
Inventor.
Thomas R. McKnight,
by Bond Adams Pickard & Jackson.
att'ys.

THE NORRIS PETERS CO., PHOTO-LITHO., WASHINGTON, D. C.

UNITED STATES PATENT OFFICE.

THOMAS R. McKNIGHT, OF AURORA, ILLINOIS, ASSIGNOR TO THE WESTERN WHEELED SCRAPER COMPANY, OF SAME PLACE.

DUMP-CAR.

SPECIFICATION forming part of Letters Patent No. 607,521, dated July 19, 1898.

Application filed May 14, 1897. Serial No. 636,467. (No model.)

*To all whom it may concern:*

Be it known that I, THOMAS R. MCKNIGHT, a citizen of the United States, residing in Aurora, Kane county, Illinois, have invented new and useful Improvements in Dump-Cars, of which the following is a specification.

My invention relates to railway-cars used in grading for transporting dirt and dumping it at the desired place, and has for its object to reduce the height of the car and enable the box to take the same angle in dumping the load as in other cars heretofore in use, which arrangement is advantageous in filling the box, as the shovelers are not required to lift the load on the shovels so high.

A further object is to so mount the box that in case the height of the ordinary car is retained the box may be carried on a wider-gage track without interfering with its being properly dumped.

To this end one part of my invention consists in mounting the box centrally upon standards pivoted at both their upper and lower ends, so that the box may be thrown to one side of the center of the car, causing it to tilt over and discharge its contents.

My invention further consists in providing means for locking the supports in position to carry the box in its horizontal position and means for unlocking the various supports simultaneously, so that the box may be readily dumped; also, in certain improved details, which will be hereinafter pointed out.

Figure 1:
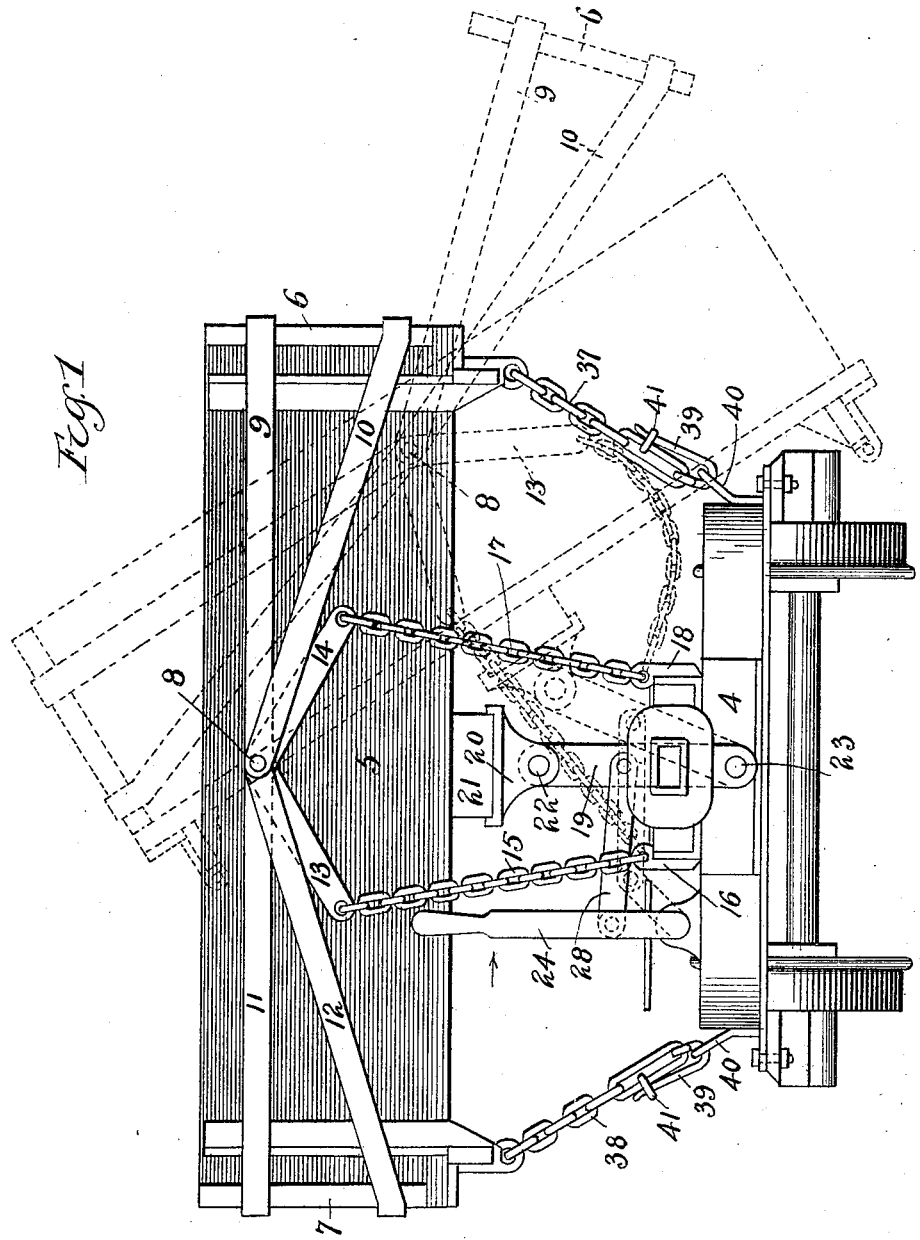
Figure 2:
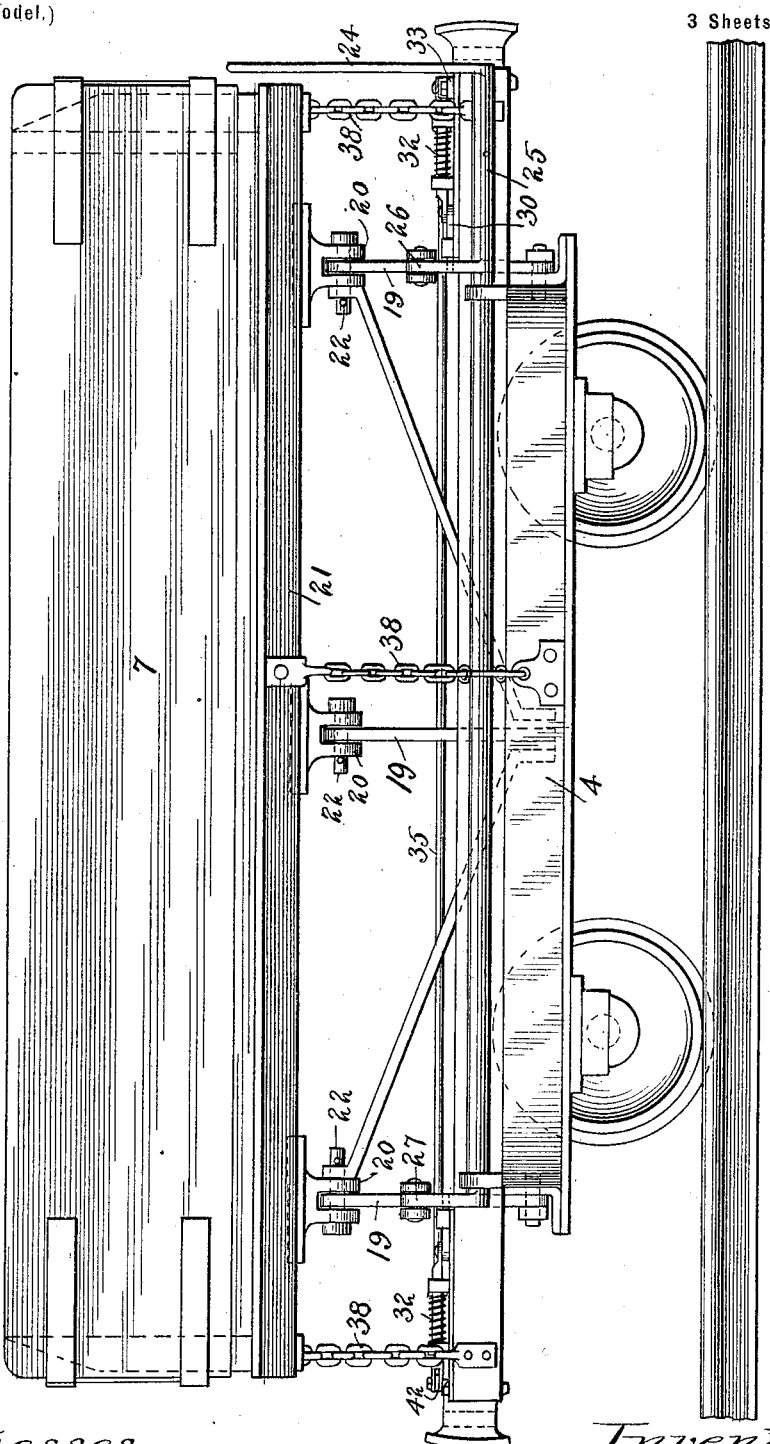
Figure 3:
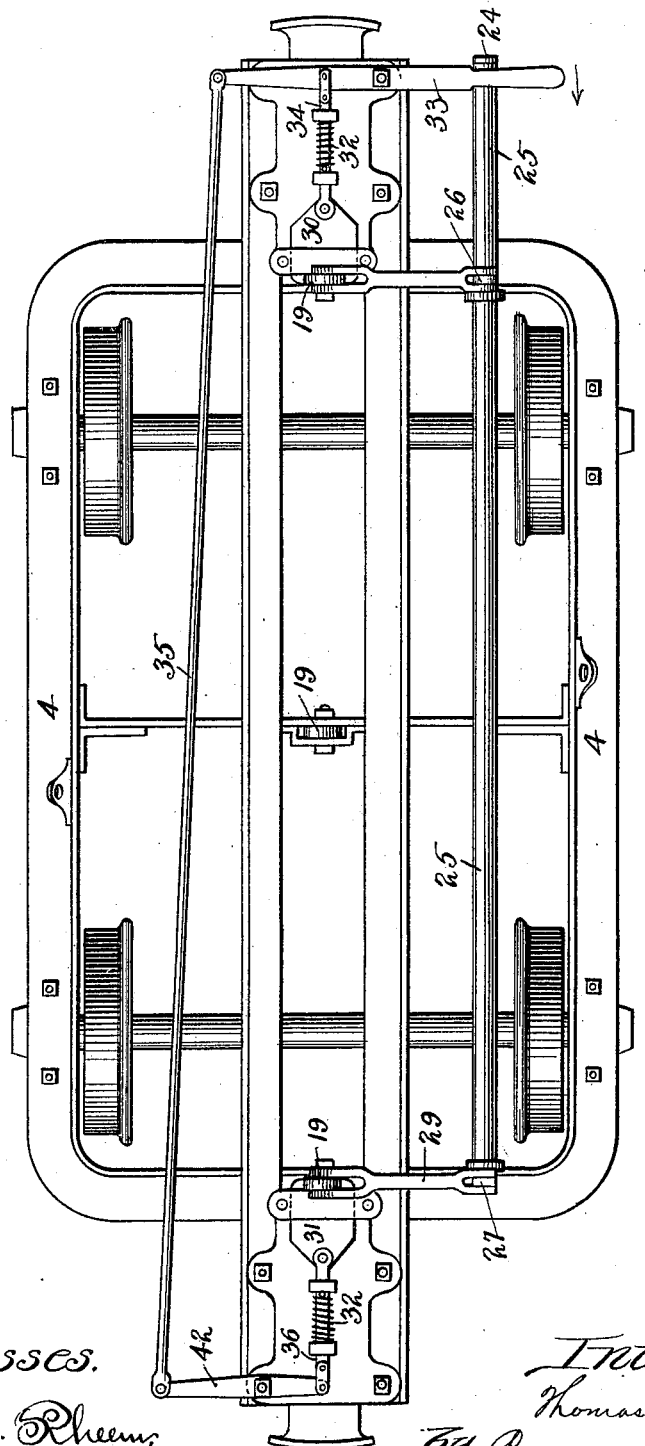

In the accompanying drawings, Figure 1 is an end view showing the car with the box in its horizontal or normal position, showing also in dotted lines the position of the box when tilted for the purpose of dumping it. Fig. 2 is a side elevation. Fig. 3 is a plan view of the truck and locking mechanism.

Referring to the drawings, 4 indicates the frame of the truck, which is of suitable shape to carry the various parts mounted upon it.

5 indicates the box, which is provided with side gates 6 7, such side gates being pivotally connected to pivots 8 at the ends of the car by bars 9 10 11 12, respectively, as shown in Fig. 1. The side gates 6 7 are rocked about the pivots 8 up from the sides of the box to permit the contents thereof to be discharged by means of levers 13 14, respectively, which are connected rigidly to the supporting-bars of the respective side gates. As shown in Fig. 1, the lever 13, which is connected to one or both of the bars 9 10, extends beyond the pivot 8 and is connected by a chain 15 or other flexible connection to a stationary part 16 of the truck. Similarly the lever 14 is connected by a chain 17 to a stationary portion 18 of the truck. The arrangement is such that when the box is tilted, as indicated by dotted lines in Fig. 1, and as will be hereinafter more fully explained, the movement of the pivot 8 away from the connection 16 will cause the chain 15 to move the lever 13 sufficiently to raise the side gate 6 and permit the discharge of the contents of the box, as indicated by dotted lines. Similarly should the box be rocked in the opposite direction the chain 17 will raise the side gate 7.

The box 5 is supported centrally upon one or more rocking supports or standards 19, said standards being pivoted at their lower ends to the truck-frame 4 and at their upper ends to bearing-plates 20, connected to a longitudinal beam 21, secured to the box, as shown in Figs. 1 and 2. In the drawings I have shown three standards 19; but I wish it to be understood that I do not restrict myself to the use of the number shown. Neither do I restrict myself to the specific devices shown for pivotally connecting the box to the rocking standards.

From the above description it will be seen that when the pivots 22 23 of the standards 19 are in the same vertical plane—that is, when the standards are in a vertical position—the box will have no tendency to swing bodily sidewise; but should the standards 19 be rocked to one side, throwing the pivot 22 out of the vertical plane of the pivot 23, the box will at once tilt and swing bodily sidewise, discharging its contents at one side. To effect such tilting, therefore, a slight rocking motion only of the standards 19 is necessary, as after the operation commences the weight of the box continues it.

To effect the rocking of the standards 19, I provide a hand-lever 24 at one end of the car, which hand-lever is connected to a rock-shaft 25, provided with crank-arms 26 27, said crank-arms being connected by connecting-bars 28

29 to the end standards 19, so that by rocking the shaft 25 by means of the lever 24 the box will be dumped. I have shown the lever 24 as connected to two of the standards 19; but I do not limit myself to that arrangement.

For locking the standards 19 in a vertical position to guard against their rocking accidentally I provide locking mechanism, consisting of lock-plates 30 31, arranged at the ends of the car and provided with notches or recesses adapted to receive the end standards 19, as shown in Fig. 3. Springs 32 are provided, which hold the lock-plates 30 31 in engagement with their respective standards, and the inner edges of said lock-plates are beveled, so that as the standards swing back to vertical position they will be automatically engaged and locked in place by said lock-plates.

For releasing the standards when it is desired to dump the box I provide a lever 33, which is pivotally mounted upon the truck-frame 4, preferably near the hand-lever 24, and is connected to the stem 34 of the lock-plate 30 and by a connecting-rod 35 and lever 42 to the stem 36 of the lock-plate 31. By this construction by moving the hand-lever 33 in the direction indicated by the arrow in Fig. 3 both lock-plates 30 31 may be simultaneously moved out of engagement with the respective standards, and by then operating the lever 24 the standards may be rocked to dump the box.

37 38 indicate chains at opposite sides of the car connecting the box and truck-frame. The chains 37 38 carry at their lower ends hooks 39, which pass through loops 40 on the truck-frame, said hooks being held in operative position by sliding rings 41, carried by links of the chains 37 38, the arrangement being such that by sliding the rings 41 beyond the ends of the hooks 39 the hooks will be free to swing downward out of the loops 40, releasing the chains 37 38. In dumping the box it is necessary that the chains at the side of the box opposite to that at which the load is to be discharged be released at one end in order to permit the corresponding side of the box to swing upward. The chains 37 38 serve to hold the box steady upon the standards 19 when in carrying position and prevent it from tilting upon said standards.

The operation of my improved dump-car is as follows: The car being in its horizontal or carrying position, should it be desired to dump it on the right-hand side, as shown in Fig. 1, the ring 41 of the chain 38 would be moved clear of the hook 39, permitting such hook to be disengaged from the loop 40. The hand-lever 33 would then be operated to release the standards 19 from the lock-plates 30 31, when by operating the lever 24 in the direction indicated by the arrow in Fig. 1 the standards 19 would be swung to the right, throwing the pivot 22 out of the vertical plane of the pivot 23. Consequently the box would tilt, as shown by dotted lines in Fig. 1. At the same time the chain 15 would rock the lever 13 and swing the side gate 6 up, permitting the discharge of the contents of the box. After the box has been dumped by reversing the movement of the lever 24 the standards 19 will be restored to their vertical position, where they are locked by the lock-plates 30 31, and the left-hand side of the box may then be swung downward, bringing the box into horizontal position, so that the chain 38 can be again secured to the loop 40 to hold the box in its horizontal position.

I have described in detail my improved dump-car as illustrated in the accompanying drawings; but I wish it to be understood that my invention is not limited to the specific details of such construction, except as specifically claimed, as many modifications may be made without departing from my invention. By my improved construction of dump-car, as will be understood from the above description, the height of the box may be much reduced from that at which it has heretofore been necessary to place the box in order to secure the proper angle for dumping the load effectually, inasmuch as in my construction the box is swung bodily to one side and may be tilted over to any desired angle. As has already been suggested, the reduction of the height of the box is exceedingly advantageous, as it greatly economizes the work of loading, in view of the fact that the load is not required to be raised so high. Furthermore, my improvement is also advantageous in that in a car of the ordinary height of box embodying my improvements the car may be carried on a wider-gage track than has heretofore been practicable.

That which I claim as my invention, and desire to secure by Letters Patent, is—

1. In a dump-car, the combination with a truck, of a box, a support for the box pivoted centrally upon the truck and pivoted centrally also to the box, and means for moving said box bodily to one side or the other and tilting it upon its support to discharge its contents at either side of the car, substantially as described.

2. In a dump-car, the combination with a truck, of a box, and a laterally-movable support for the box pivoted centrally upon the truck and pivoted centrally also to the box, substantially as described.

3. In a dump-car, the combination with a truck, of a box, a laterally-movable support for said box, pivoted centrally upon the truck and pivoted centrally also to the box, said box being arranged to tilt upon its support to discharge its contents, and a lever adapted to be operated to move said support in either direction, substantially as described.

4. In a dump-car, the combination with a truck, of a box, laterally-movable supports for said box, arranged centrally thereunder near the ends of the box, said box being arranged to tilt upon its supports to discharge its contents, and a lever at one end of the car and connected to one of said supports for moving it laterally to one side or the other, substantially as described.

5. In a dump-car, the combination with a truck, of a box, a rocking support for said box, said support being arranged centrally under the box, and the box being arranged to tilt upon its support in either direction, and locking mechanism adapted to engage said support and lock it in a vertical position, substantially as described.

6. In a dump-car, the combination with a truck, of a box, a laterally-movable support pivoted centrally upon the truck and pivoted centrally also to the box, said box being arranged to tilt upon its support in either direction, and lateral stays for said box, substantially as described.

7. In a dump-car, the combination with a truck, and a box, of rocking standards at the ends of the car, pivoted centrally upon the truck and pivoted centrally also to the box, locking devices at the ends of the car for holding said standards in a vertical position, a lever at one end of the car, and means for operating both said locking devices, to unlock the standards, by the actuation of said lever, substantially as described.

8. In a dump-car, the combination with a truck, and rocking standards mounted thereupon, near the ends thereof, of a box mounted upon said standards, a hand-lever, a rock-shaft to which said lever is connected, and links connecting said rock-shaft with said standards, whereby by rocking said shaft said standards may be rocked, substantially as described.

9. In a dump-car, the combination with a truck, and rocking standards mounted thereupon near the ends thereof, of a box mounted upon said standards, a hand-lever, a rock-shaft to which said lever is connected, links connecting said rock-shaft with said standards, whereby by rocking said shaft said standards may be rocked, and lateral stays connecting the sides of the box with the truck, substantially as described.

10. In a dump-car, the combination with a truck, and rocking standards mounted thereupon near the ends thereof, of a box mounted upon said standards, a hand-lever, a rock-shaft to which said lever is connected, links connecting said rock-shaft with said standards, whereby by rocking said shaft said standards may be rocked, locking-plates at the ends of the car adapted to engage said standards to hold them in a vertical position, and a hand-lever for operating said locking-plates to release said standards, substantially as described.

11. In a dump-car, the combination with a truck, and rocking standards mounted thereupon near the ends thereof, of a box mounted upon said standards, a hand-lever, a rock-shaft to which said lever is connected, links connecting said rock-shaft with said standards, whereby by rocking said shaft said standards may be rocked, locking-plates at the ends of the car adapted to engage said standards to hold them in a vertical position, a hand-lever 33 connected directly to one of said locking-plates, and a connecting-rod 35 connecting said hand-lever with the locking-plate at the other end of the car, substantially as described.

12. In a dump-car, the combination with a truck, and a box, of rocking standards at the ends of the car, said box being pivotally mounted upon said standards, locking devices at the ends of the car for locking said standards in a vertical position, a lever at one end of the car, and means for operating both said locking devices, to unlock the standards, by the actuation of said lever, substantially as described.

T. R. McKNIGHT.

Witnesses:
C. B. RUKGABER,
J. R. SIMPSON.